(12) United States Patent
Hasegawa et al.

(10) Patent No.: US 9,216,719 B2
(45) Date of Patent: *Dec. 22, 2015

(54) PARKING LOCK CONTROL DEVICE FOR VEHICLE AND CONTROL METHOD

(75) Inventors: Junichi Hasegawa, Yokohama (JP); Yasuhiro Yamauchi, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 61 days.

This patent is subject to a terminal disclaimer.

(21) Appl. No.: 14/110,798

(22) PCT Filed: Mar. 5, 2012

(86) PCT No.: PCT/JP2012/055527
§ 371 (c)(1),
(2), (4) Date: Oct. 9, 2013

(87) PCT Pub. No.: WO2012/169245
PCT Pub. Date: Dec. 13, 2012

(65) Prior Publication Data
US 2014/0032074 A1    Jan. 30, 2014

(30) Foreign Application Priority Data

Jun. 7, 2011  (JP) .................. 2011-127193

(51) Int. Cl.
*B60T 1/06* (2006.01)
*B60T 7/12* (2006.01)
(Continued)

(52) U.S. Cl.
CPC . *B60T 7/12* (2013.01); *B60L 11/04* (2013.01); *B60L 15/2009* (2013.01); *B60L 15/2036* (2013.01); *B60T 1/005* (2013.01); *B60T 1/06* (2013.01); *B60T 7/122* (2013.01); *B60L 2220/44* (2013.01); *B60L 2240/421* (2013.01); *B60L 2240/423* (2013.01); *B60L 2240/461* (2013.01); *B60L 2240/463* (2013.01);
(Continued)

(58) Field of Classification Search
None
See application file for complete search history.

(56) References Cited

U.S. PATENT DOCUMENTS 3,690,737 A    9/1972  Neese et al.
3,893,528 A    7/1975  Rehfeld
(Continued)

FOREIGN PATENT DOCUMENTS

JP    2006-044458 A    2/2006
JP    2006-231954 A    9/2006
(Continued)

OTHER PUBLICATIONS

J. Hasegawa et al., USPTO Non-Final Office Action dated Feb. 12, 2015, 16 pgs.
(Continued)

*Primary Examiner* — John R Olszewski
*Assistant Examiner* — Jess Whittington
(74) *Attorney, Agent, or Firm* — Foley & Lardner LLP

(57) ABSTRACT

In a parking lock control device of a vehicle of the present invention, when a parking lock activation command is outputted, either one of parking lock mechanisms is activated. In this state, a movement of the vehicle is estimated or detected, and when the vehicle movement is a predetermined amount or more, the parking lock control device generates a torque that suppresses the vehicle movement by the motor connected to the other parking lock mechanism. Power consumption associated with the parking lock is then suppressed.

5 Claims, 7 Drawing Sheets

(51) Int. Cl.
  *B60T 1/00*    (2006.01)
  *B60L 15/20*   (2006.01)
  *B60L 11/04*   (2006.01)

(52) U.S. Cl.
  CPC ....... *B60L 2240/642* (2013.01); *B60L 2240/80* (2013.01); *B60L 2250/22* (2013.01); *B60L 2260/28* (2013.01); *B60L 2260/42* (2013.01); *B60L 2270/145* (2013.01); *Y02T 10/642* (2013.01); *Y02T 10/70* (2013.01); *Y02T 10/7077* (2013.01); *Y02T 10/7275* (2013.01); *Y02T 10/7291* (2013.01); *Y02T 90/16* (2013.01)

(56) References Cited

U.S. PATENT DOCUMENTS

| | | | |
|---|---|---|---|
| 7,026,922 | B1 | 4/2006 | Talukder et al. |
| 2002/0084162 | A1 | 7/2002 | Schafer et al. |
| 2004/0159474 | A1 | 8/2004 | Moor, Jr. |
| 2007/0284181 | A1 | 12/2007 | Muranaka |
| 2008/0033617 | A1* | 2/2008 | Watanabe et al. ............. 701/48 |
| 2009/0158790 | A1* | 6/2009 | Oliver ............................ 70/202 |
| 2010/0090522 | A1* | 4/2010 | Bensch et al. ........... 303/122.15 |
| 2010/0312981 | A1 | 12/2010 | Kajimura |
| 2010/0324776 | A1 | 12/2010 | Maire |
| 2012/0041661 | A1* | 2/2012 | Kaneko ........................... 701/70 |
| 2013/0056315 | A1 | 3/2013 | Bieltz et al. |
| 2014/0336892 | A1 | 11/2014 | Braunberger |

FOREIGN PATENT DOCUMENTS

| | | |
|---|---|---|
| JP | 2007-314036 A | 12/2007 |
| JP | 2011-051443 A | 3/2011 |

OTHER PUBLICATIONS

U.S. Appl. No. 14/110,793, filed Oct. 9, 2013, Hasegawa et al.
U.S. Appl. No. 14/110,802, filed Oct. 9, 2013, Hasegawa et al.
Hasegawa, J. et al. USPTO Non-final Office Action U.S. Appl. No. 14/110,793, 15 pgs.
J. Hasegawa, U.S. PTO Notice of Allowance, U.S. Appl. No. 14/110,793, dated Mar. 30, 2015, 16 pages.
J. Hasegawa et al., USPTO Notice of Allowance U.S. Appl. No. 14/110,802 dated Aug. 28, 2015, (11 pgs.).

* cited by examiner

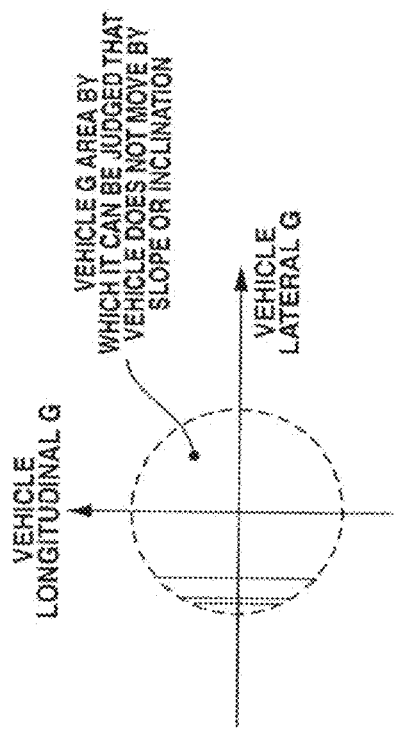
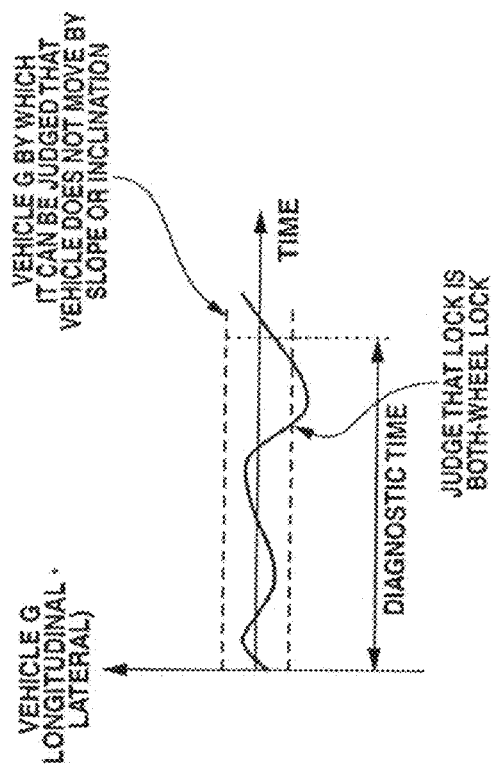
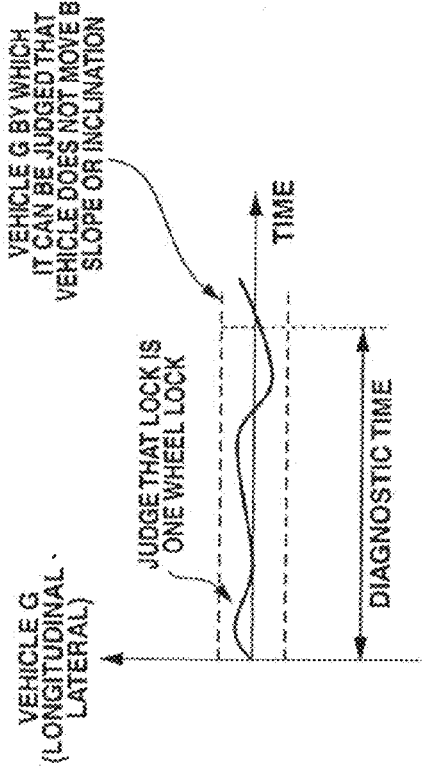

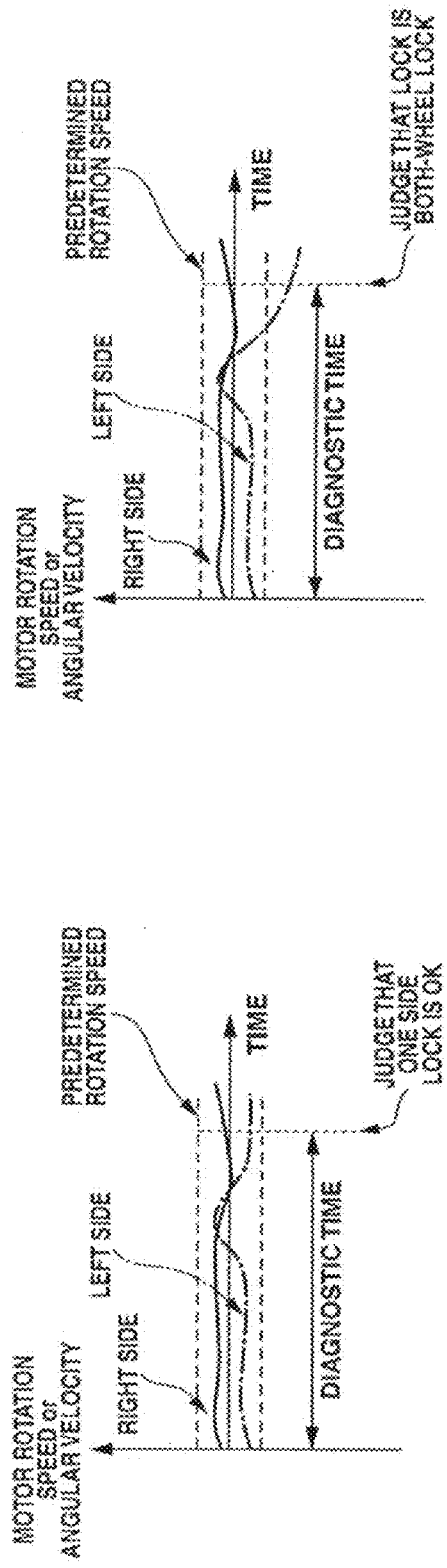
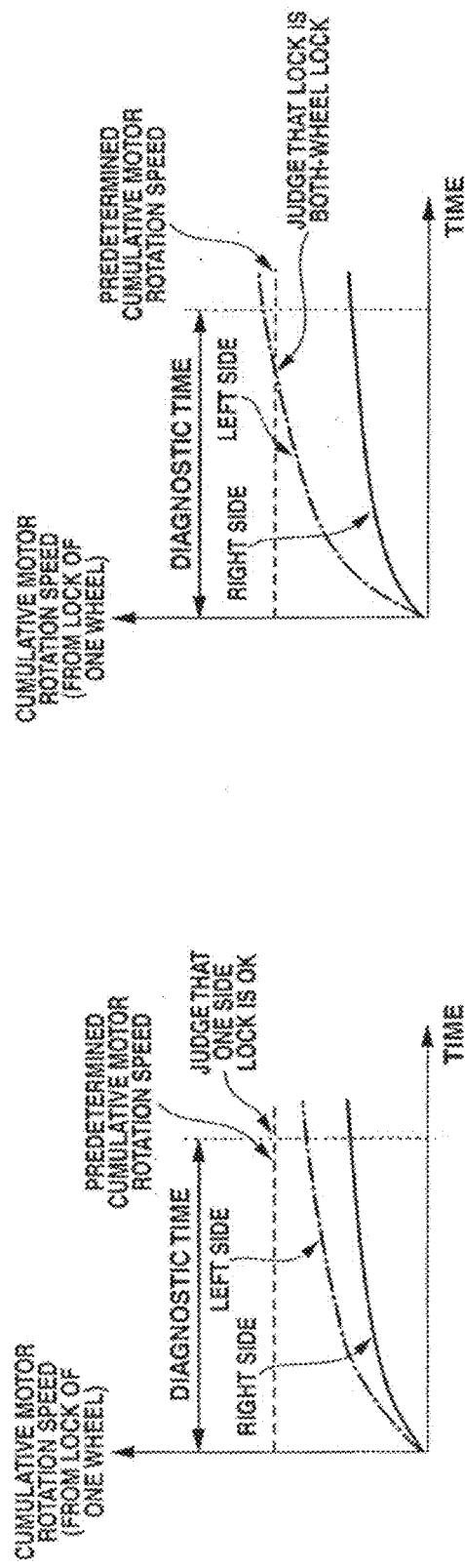
FIG.5A
FIG.5B

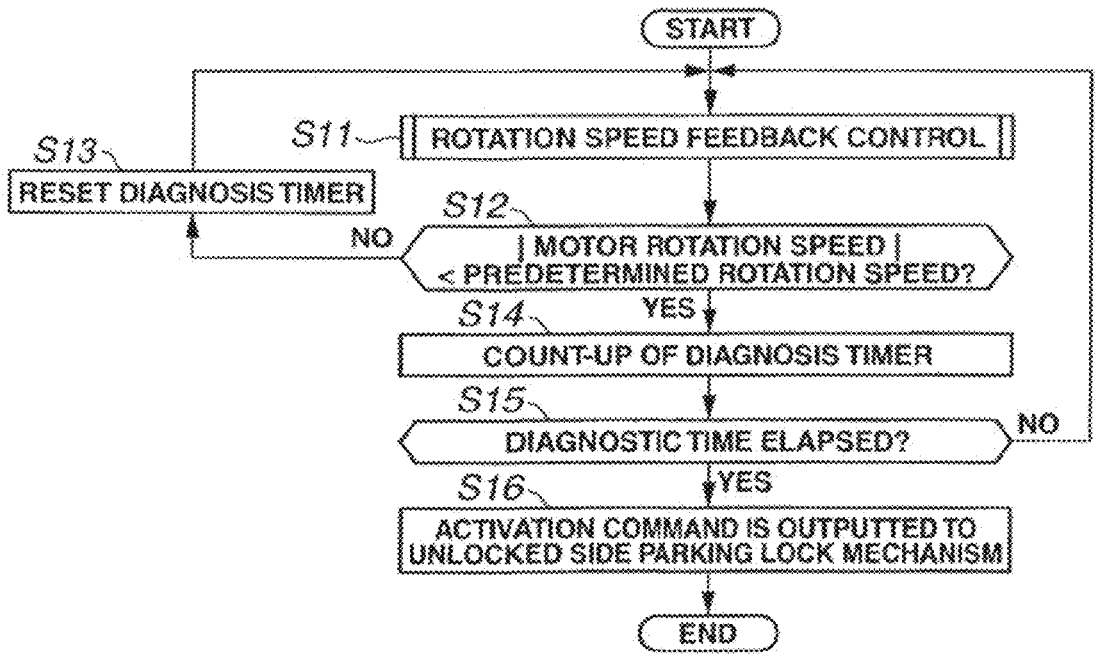
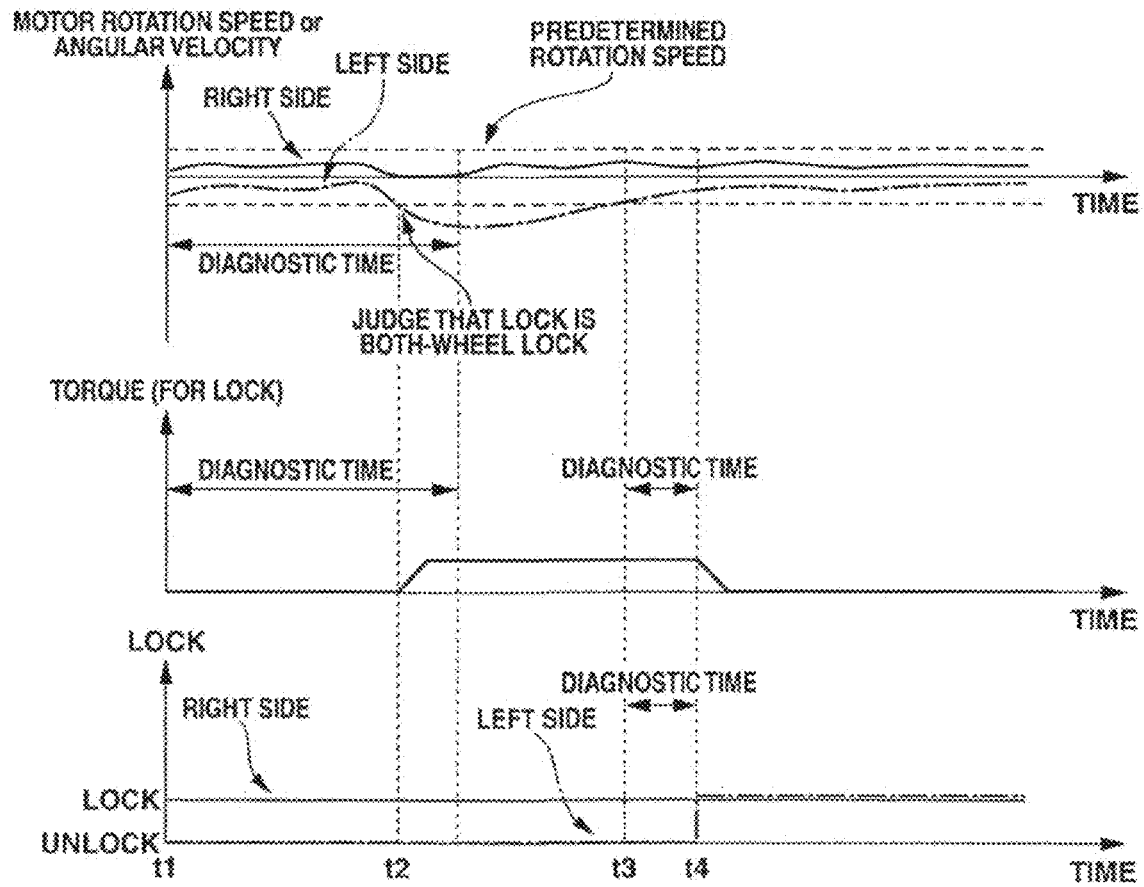

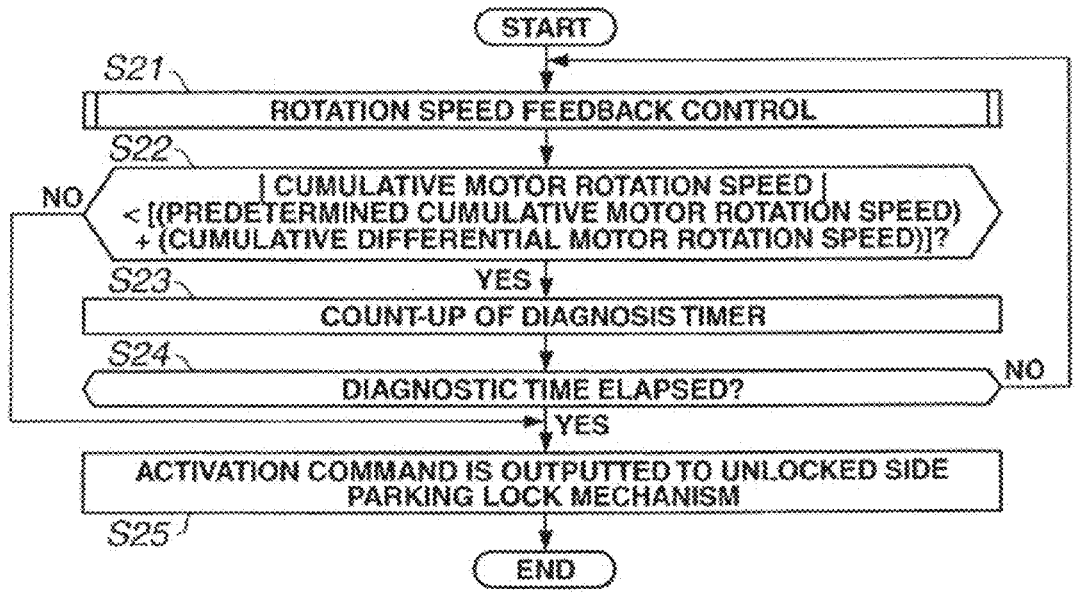
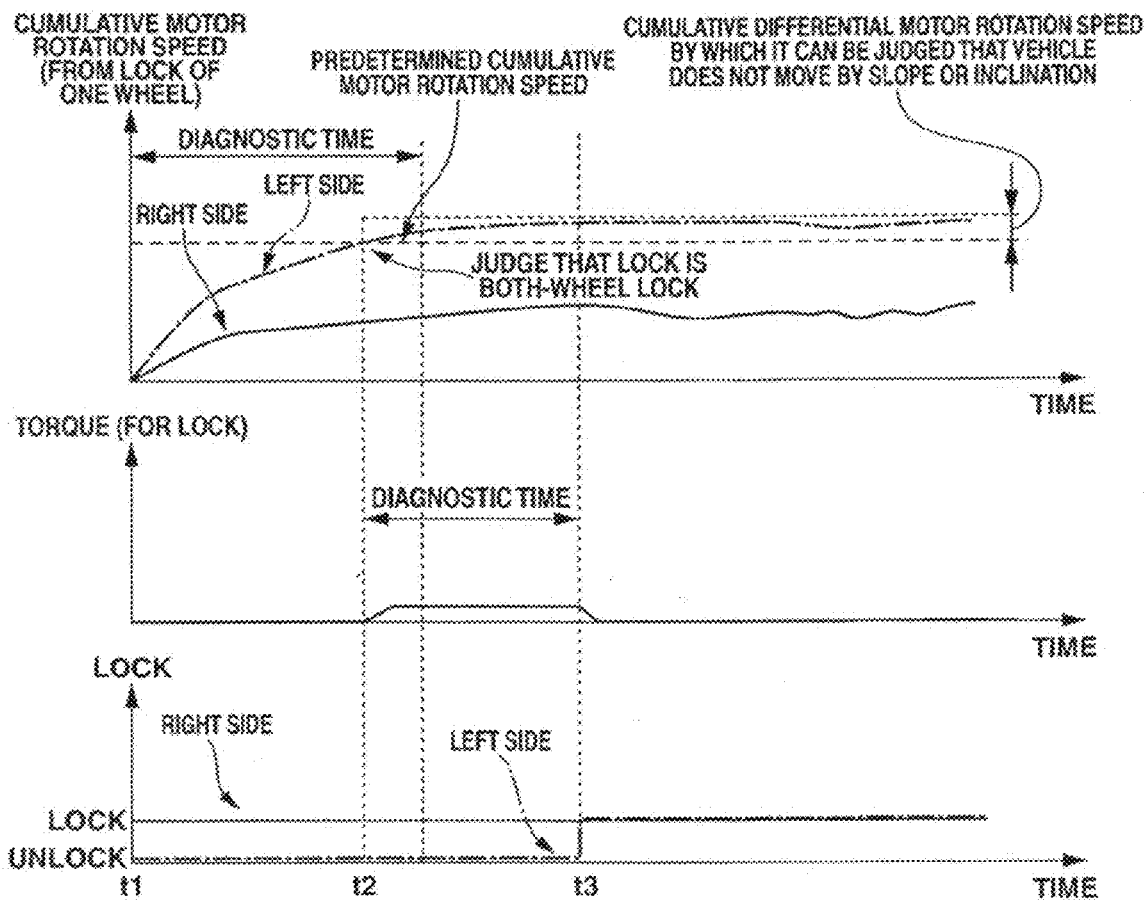

PARKING LOCK CONTROL DEVICE FOR VEHICLE AND CONTROL METHOD

TECHNICAL FIELD

The present invention relates to a parking lock control device that locks a wheel.

BACKGROUND ART

A related art of a Patent Document 1 has disclosed a configuration in which, in a vehicle having a motor for each wheel, a parking lock mechanism is provided at each wheel, and when a parking lock request is outputted, by activating the parking lock mechanism of each wheel, the wheel is locked.

However, in a case where a plurality of parking lock mechanisms are activated, there arises a problem that increases power consumption.

CITATION LIST

Patent Document

Patent Document 1: Japanese Patent Provisional publication Tokkai No. 2007-314036

SUMMARY OF THE INVENTION

An object of the present invention is to provide a parking lock control device for the vehicle, which is capable of suppressing the power consumption.

In the parking lock control device for the vehicle of the present invention, when a parking lock activation command is outputted, either one of parking lock mechanisms is activated. And also, a movement of the vehicle is estimated or detected, then when the vehicle moves a predetermined amount or more, a torque that suppresses the vehicle movement is generated by the motor connected to the other parking lock mechanism.

Accordingly, especially in a case where the vehicle does not move, by activating only one parking lock mechanism, the power consumption can be suppressed, and a travel distance can be made longer. Further, in a state in which only the one parking lock mechanism is activated, when the vehicle moves, the vehicle movement is suppressed by the motor. Therefore, the vehicle movement can be suppressed under all conditions.

BRIEF DESCRIPTION OF DRAWINGS

FIGS. 3A, 3B and 3C are schematic diagrams for explaining one wheel/both wheels lock determination process of the embodiment.

FIGS. 5A and 5B are schematic diagrams showing a vehicle movement judgment process of the embodiment.

FIG. 6 is a flow chart for operating a drive motor when outputting an activation command to an unlocked side parking lock mechanism on the basis of a motor rotation speed, of the embodiment.

FIG. 7 is time charts for operating the drive motor when outputting the activation command to the unlocked side parking lock mechanism, of the embodiment.

FIG. 8 is a flow chart for operating the drive motor when outputting the activation command to the unlocked side parking lock mechanism on the basis of a cumulative motor rotation speed, of the embodiment.

FIG. 9 is time charts for operating the drive motor when outputting the activation command to the unlocked side parking lock mechanism on the basis of the cumulative motor rotation speed, of the embodiment.

DESCRIPTION OF EMBODIMENTS

Figure 1:
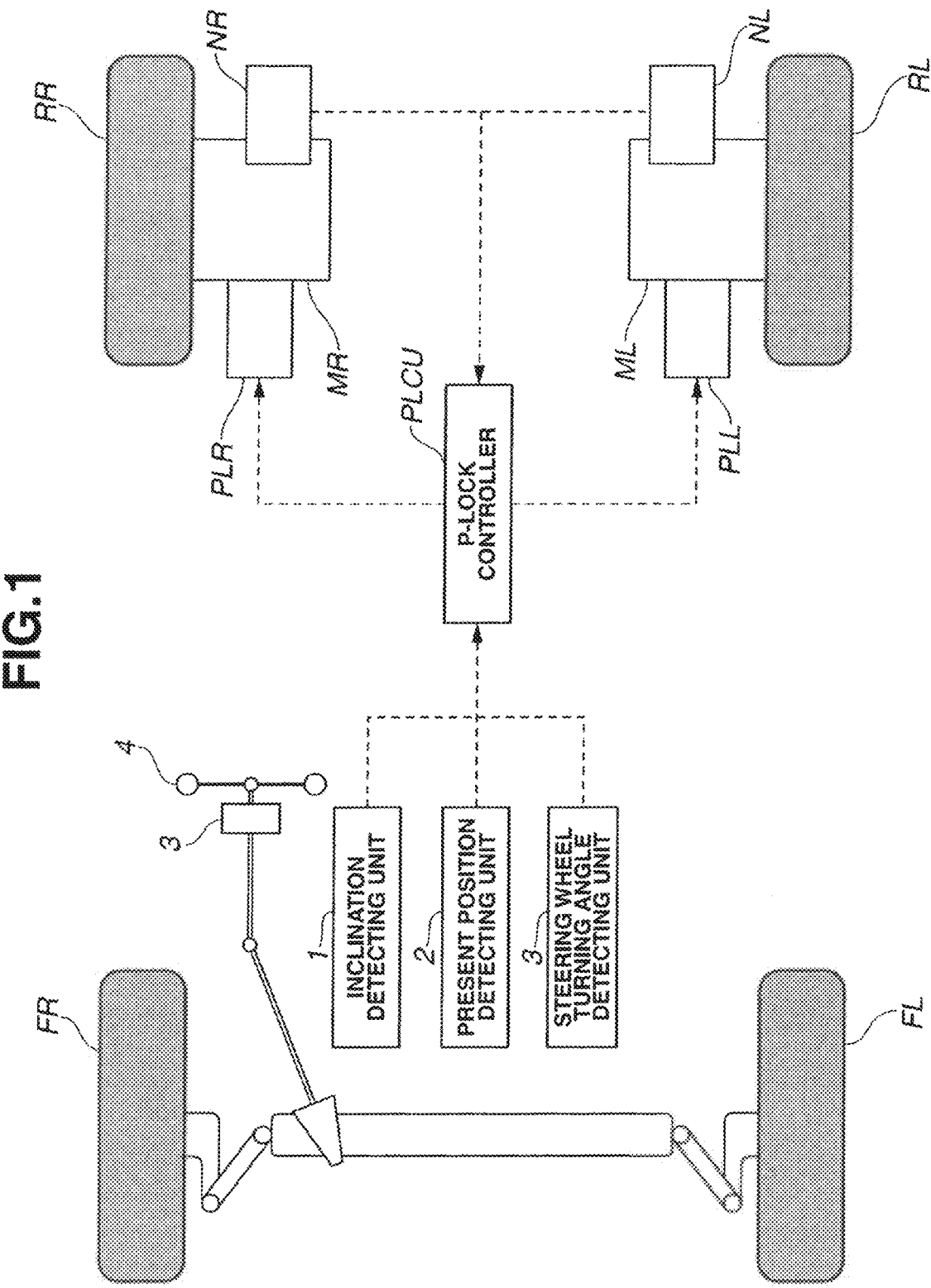
FIG. 1 is a general system diagram of a vehicle that is provided with a parking lock control device of an embodiment of the present invention.

FIG. 1 is a general system diagram of a vehicle that is provided with a parking lock control device of an embodiment of the present invention. The vehicle of the present embodiment is a rear wheel drive type electric vehicle, and has front wheels FR, FL that are driven wheels and rear wheels RR, RL that are driving wheels.

The rear wheel RR on a right side of the vehicle is provided with an in-wheel type drive motor MR (a right side motor) that directly drives this rear wheel RR, a parking lock mechanism PLR that can stop an rotation axis of the drive motor MR by connecting the rotation axis of the drive motor MR to a vehicle body side and a resolver NR (a vehicle behavior detecting unit) that detects a rotation speed (or a rotation angle) of the drive motor MR. Likewise, the rear wheel RL on a left side of the vehicle is provided with an in-wheel type drive motor ML (a left side motor) that directly drives this rear wheel RL, a parking lock mechanism PLL that can stop an rotation axis of the drive motor ML by connecting the rotation axis of the drive motor ML to the vehicle body side and a receiver NL (the vehicle behavior detecting unit) that detects a rotation speed (or a rotation angle) of the drive motor ML.

Each of the parking lock mechanisms PLR, PLL is a mechanism that locks the rotation by the fact that a parking pole is engaged with a parking gear. The parking pole is configured to be actuated by an electromagnetic actuator. The electromagnetic parking lock mechanism is a well-known technique, its detailed explanation is therefore omitted here.

Further, the parking lock control device has an inclination detecting unit 1 (the vehicle behavior detecting unit) that detects an inclination of the vehicle, a present position detecting unit 2 (the vehicle behavior detecting unit) that detects a present position and a steering wheel turning angle detecting unit 3 that detects a turning angle of a steering wheel.

The inclination detecting unit 1 is, for instance, a longitudinal (back-and-forth) G sensor that detects a longitudinal (back-and-forth) acceleration of the vehicle and/or a lateral G sensor that detects a lateral (side-to-side) acceleration of the vehicle. The inclination detecting unit 1 is configured to not only detect the acceleration acting on a travelling vehicle but also detect an inclination of road surface of a place where the vehicle is currently positioned during a vehicle stop or almost in a state of the vehicle stop.

The present position detecting unit 2 is, for instance, a navigation system using GPS. The present position detecting unit 2 is configured to recognize or realize road surface inclination information etc. of the present position.

The steering wheel turning angle detecting unit 3 is a steering angle sensor that detects a steering angle that is an operating amount of a steering wheel 4, and detects a value corresponding to a tire turning angle of the front wheels FR, FL at the present tine point. Here, the other sensor (e.g. a sensor detecting a movement of a rack) that can detect the tire turning angle could to provided.

In addition, the parking lock control device has a parking lock controller PLCU. The parking lock controller PLCU outputs an activation command to the parking lock mechanisms PLR, PLL on the basis of information of a slope of the road surface where the vehicle is positioned which is detected by the inclination detecting unit 1, the road surface inclination information of the present vehicle position which is detected by the present position detecting unit 2, the steering angle detected by the steering wheel turning angle detecting unit 3 and rear wheel rotation speeds detected by the resolvers NR, NL provided at the rear wheels RR, RL.

Features of the embodiment will be explained here. As described above, the electric vehicle of the embodiment has the parking lock mechanisms PLR, PLL at the both rear wheels. And it is conceivable that when activating the parking lock mechanism, the activation command is outputted to the both parking lock mechanisms PLR, PLL and the both rear wheels are locked. However, since the electrical actuator is used for the activation of this parking lock mechanism, power consumption is increased. Further, in a case where the rear wheels are merely locked on a flat road, if only one wheel is locked without locking the both wheels, a purpose of forbidding (stopping) movement of the vehicle is achieved.

Therefore, in she embodiment, in a circumstance in which the road is basically the flat road and even if the vehicle is parked as it is, the movement of the vehicle does not occur, a lock command is outputted to only the one wheel. With this manner, the power consumed by the electrical actuator of the parking lock mechanism can be suppressed, and it is possible to increase a travel distance.

Here, as explained above, in the case of the flat road, locking only the one wheel brings no problem. However, if the vehicle is parked with only the one wheel locked in a state in which the vehicle is positioned on an inclined road surface (e.g. an inclined parking lot), there is a problem that the other wheels go round and the vehicle slightly moves with the locked wheel being a center.

Further, the activation command to the parking lock mechanism is basically outputted according to a signal generated upon shift of a transmission shift lever to a parking range by driver's shift lever operation. Thus, the activation command is not necessarily outputted after the vehicle stop, but there is a case where the activation command is outputted and the parking lock mechanism is activated in a state in which the vehicle has a slight vehicle speed. At this time, if only the one wheel is locked, there is a problem that the other wheels go round by inertia of the vehicle with the locked wheel stopped, and the vehicle rotates with the locked wheel being the center, then the vehicle behavior is unsettled.

Thus, in the embodiment, as a basic control, if the road is the flat road, the lock command is outputted to only the one wheel. In addition to this control configuration, in a case where there is a risk that the vehicle behavior will be unsettled or the vehicle behavior is actually unsettled due to the activation of the one parking lock mechanism, or in a case where there is a risk that the vehicle will move from the vehicle stop state or the vehicle actually moves due to the activation of the one parking lock mechanism, the both parking lock mechanisms are activated.

In the following description, the control configuration will be explained.

Figure 2:
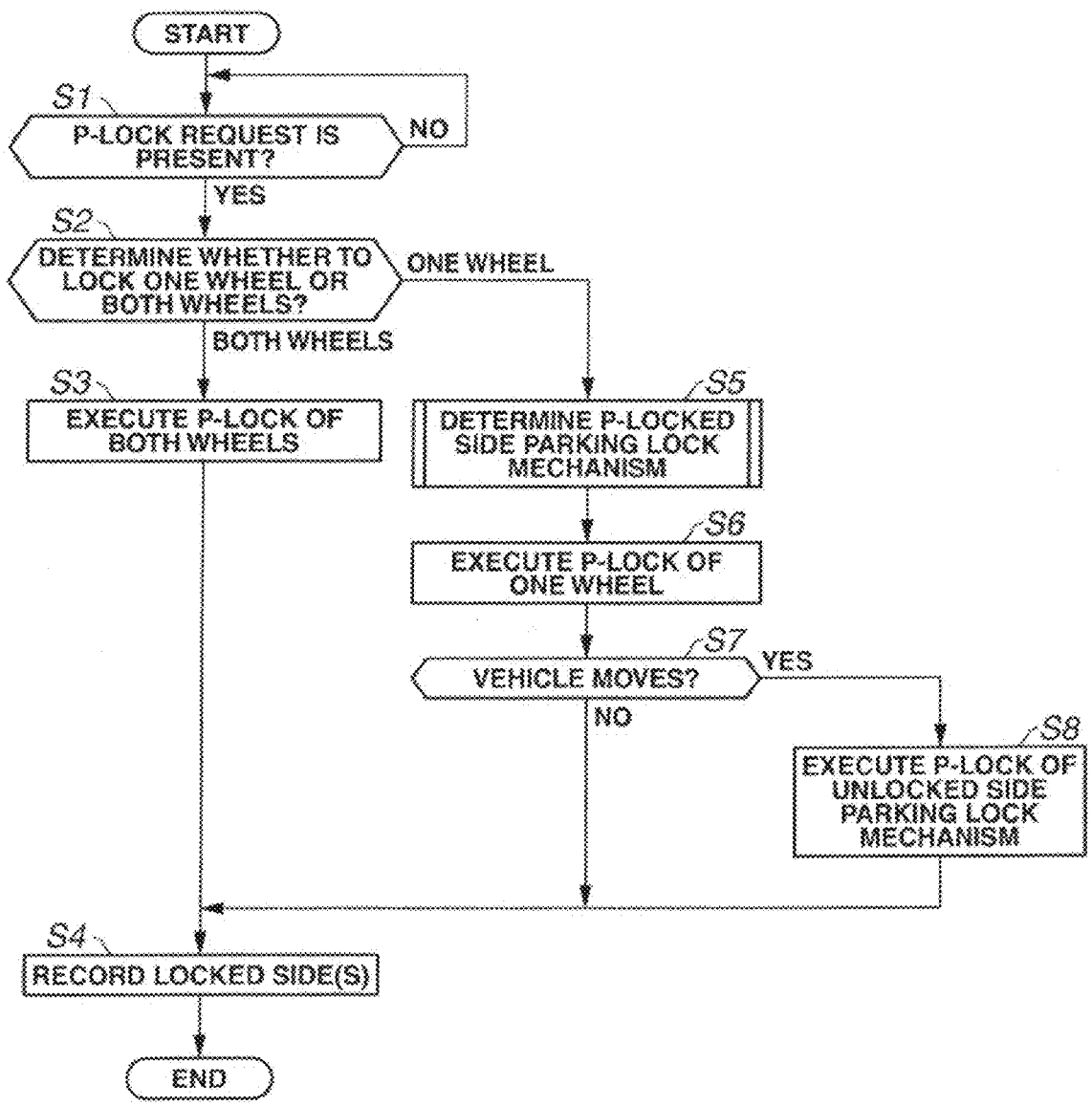
FIG. 2 is a flow chart showing a parking lock mechanism control process executed in a parking lock controller of the embodiment.

FIG. 2 is a flow chart showing a parking lock mechanism activation control process executed in the parking lock controller of the embodiment.

At step S1, a judgment is made as to whether or not an activation request of the parking lock mechanism is present. If it is judged that the activation request of the parking lock mechanism is present, the routine proceeds to step S2. If it is judged that the activation request of the parking lock mechanism is not present, this step is repeated. Here, the activation request of the parking lock mechanism indicates a case where the shift lever operated by the driver is positioned at the parking range. Further, even if the parking lock mechanism is activated during travel at some speed, since only a so-called ratcheting state in which the parking pole is flipped by the parking gear occurs, the activation request is basically received at any timing. However, depending on other conditions, the activation request of the parking lock mechanism could be cancelled. These are not especially limited.

At step S2, a determination of one wheel/both wheels lock is made. FIGS. 3A, 3B and 3C are schematic diagrams tor explaining one wheel/both wheels lock determination process of the embodiment. As shown in FIG. 3A, in a plane with the longitudinal (back-and-forth) acceleration of the vehicle being a vertical axis and the lateral (side-to-side) acceleration of the vehicle being a horizontal axis, a vehicle acceleration area, by which it can be judged that the vehicle does not move on the sloping or inclined road, is set. Then, a judgment is made as to whether or not the detected acceleration exists in this area for a predetermined diagnostic time. When judged that the detected acceleration exists in this area for the predetermined diagnostic time, it is judged that the vehicle does not move on the sloping or inclined road (see FIG. 3B). In this case, the routine proceeds to step S5. On the other hand, when the acceleration existing outside this area is detected during the diagnostic time, it is judged that there is a risk that the vehicle will move on the sloping or inclined road (see FIG. 3C). In this case, the routine proceeds to step S3.

Regarding the vehicle acceleration area, a longitudinal acceleration area could be set to be greater than a lateral acceleration area. Further, the area is set by not only a circle but also a linear-shaped rhombus.

In addition, when judged that the detected acceleration exists outside the area even once during the diagnostic time, it could be judged that there is a risk that the vehicle will move. Or, when judged that the detected acceleration continuously exists outside the area for a certain time, it could be judged that there is a risk that the vehicle will move.

In a case where the road surface inclination information of the present vehicle position, detected by the present position detecting unit 2, is the sloping or inclined road and it is possible to judge that there is a risk that the vehicle will move on the sloping or inclined road due to the one wheel lock, the routine proceeds to step S3, and the activation command is outputted to the both parking lock mechanisms PLR, PLL.

On the other hand, in a case where it is possible to judge that there is no risk that the vehicle moves by the one wheel lock at the presses time point, the routine proceeds to step S5.

At step S4, count-up of the number of times each of the right and left side parking lock mechanisms is activated is done. For instance, when the both parking lock mechanisms are activated, both count-ups are done. When the one parking lock mechanism is activated, one count-up is done.

At stop S5, a determination process, which determines the parking lock mechanism to which the parking lock command is outputted, is performed. The parking lock mechanism is determined according to the steering angle and a count-up value of the number of times of the lock.

(Judgment Process According to the Steering Angle)

First, on the basis of the steering angle detected by the steering wheel turning angle detecting unit 3, a steering direction is checked. Then, when judged that the steering wheel is steered or turned to a right hand side at a predetermined steering angle or more, the activation command is outputted to the parking lock mechanism PLL of the rear left wheel RL. When judged that the steering wheel is steered or turned to a left hand side at a predetermined steering angle or more, the activation command is outputted to the parking lock mechanism PLR of the rear right wheel RR.

Here, the reason for determining which parking lock mechanism is activated according to the steering angle will be explained.

Figure 4:
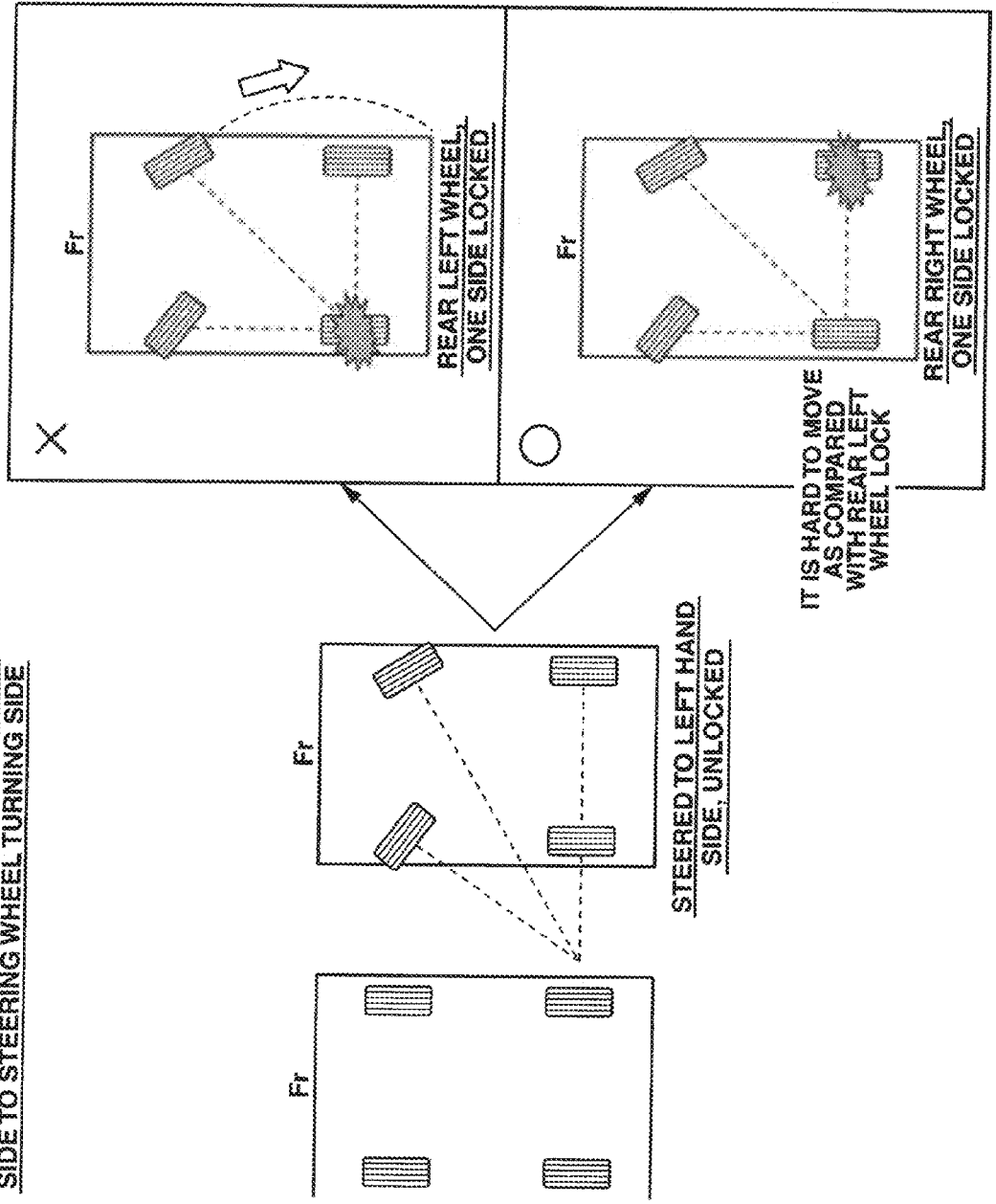
FIG. 4 is a schematic diagram showing a movement of the vehicle by an activation of the parking lock mechanism in a case where wheels of the vehicle are turned to a left hand side, of the embodiment.

FIG. 4 is a schematic diagram showing a movement of the vehicle by the activation of the parking lock mechanism in a case where the wheels of the vehicle are steered or turned to a left hand side. It the parking lock mechanism PLL of the rear left wheel RL is activated with the wheels turned to the left hand side, as shown by "x" in FIG. 4, there is a risk that the vehicle rotates with the rear left wheel RL being the center, then the movement of the vehicle can not effectively be forbidden.

In contrast to this, as shown by "o" in FIG. 4, if the parking lock mechanism PLR of the rear right wheel RR is activated, the rotation of the vehicle can be inhibited, then the movement of the vehicle can effectively be forbidden. This also occurs to a case where the wheels of the vehicle are steered or turned to a right hand side.

From the foregoing, by determining the parting lock mechanism activated according to the steering angle, the movement of the vehicle can effectively be suppressed.

(Judgment Process According to the Number of Times of the Lock)

Next, when judged that the steering angle detected by the steering wheel turning angle detecting unit 3 is smaller than a predetermined angle of the right or left hand side direction and the steering wheel is positioned at a substantially neutral position, since there is especially nothing to choose between the right and the left in terms of the vehicle behavior, the right and the left (the parking lock mechanism PLR and the parking lock mechanism PLL) is determined according to each number of times of the lock. This is because in a case where the number of times of the lock, which is counted at step S4 as mentioned above, is unbalanced and is larger on one side of the right and the left, there is a need to secure durability of the parking gear and the parking pole on the one side to excess. Thus when judged that the steering angle is positioned at the substantially neutral angle position, the activation commend is outputted to the parking lock mechanism whose number of times of the lock is smaller.

Here, in a case where the steering angle is the predetermined angle or greater, even if the above judgment process according to the number of times of the lock is performed, a judgment result according to the steering angle is given priority. This is because suppressing the movement of the vehicle is more important than securing the durability.

At step S6, the activation command is outputted to the parking lock mechanism that is determined at step S5.

At step S7, after outputting the activation command of the parking lock mechanism, a judgment is made as to whether or not the vehicle moves. If it is judged that there is a risk that the vehicle will move, the routine proceeds to step S8, and the activation command is outputted to an unlocked side parking lock mechanism. Then the routine proceeds to step S4, and the count-up of the both parking lock mechanisms is done.

On the other hand, if it is judged that there is no risk that the vehicle will move, the routine proceeds to step S4, and the count-up of the activated parking lock mechanism is done.

Here, a judgment after the output of the activation command to the parking lock mechanism will be explained.

First, in the same manner as that at step S2, a judgment is made as to whether or not the detected acceleration exists in the vehicle acceleration area for a predetermined diagnostic time. Although this judgment has already been made at step S2, by continuously making judgment even when the vehicle stops, even if the vehicle inclines, for instance, during transport by ferry, the both parking lock mechanisms can be activated.

Next, the rotation speed of each of the right and left wheels is detected by the resolvers NR, NL, and the movement of the vehicle is judged according to these rotation speeds.

FIGS. 5A and 5B are schematic diagrams showing a vehicle movement judgment process of the embodiment. FIG. 5A is time charts for indicating the judgment according to the motor rotation speed or the motor rotation angle. Since the motor rotation speed and the motor rotation angle are substantially the same, in the following description, only the judgment according to the motor rotation speed will be explained.

If an absolute value of the motor rotation speed is less than a predetermined rotation speed, it is judged that the case of the one wheel lock has no problem. If the absolute value of the motor rotation speed is the predetermined rotation speed or more, it is judged that the both-wheel lock is necessary.

Here, the predetermined rotation speed is a motor rotation speed by which it can be judged that the vehicle does not move by the slope or the inclination, and is a predetermined value. In a case where the vehicle moves forward, for instance, the rotation speed is a plus side rotation speed. In a case where the vehicle moves backward, the rotation speed is a minus side rotation speed. Then, the judgment is made as to whether or not the absolute value of the motor rotation speed is less than the predetermined rotation speed. In FIG. 5A, the predetermined rotation speed is not shown by the absolute value, but is shown including signs. That is, the positive side predetermined rotation speed and the negative side predetermined rotation speed are shown.

The resolver detecting the rotation angle which is necessary for the motor control is the one that can detect a slight rotation change together with a rotation direction. On the other hand, with regard to a wheel speed sensor used for an anti-lock brake control etc., there is a case that the wheel speed sensor can not detect the rotation direction, and also resolution of the wheel speed sensor is lower than that of the resolver. Thus, by employing the resolver, a slight movement of the vehicle and its movement direction can be detected, then a high accurate judgment can be made.

In an example shown in FIG. 5A, the judgment is made according to how much the rotation speed changes during a predetermined diagnostic time. However, the diagnosis could be carried out continuously for the predetermined diagnostic time, or the diagnosis might be carried out at regular time intervals during the predetermined diagnostic time.

FIG. 5B is time charts for indicating the judgment according to a cumulative motor rotation speed.

When the motor rotation speed is totalized and an absolute value of this cumulative motor rotation speed (i.e. a movement distance) is within a range that is smaller than a predetermined cumulative motor rotation speed, it is judged that the case of the one wheel lock has no problem. When the absolute value of the cumulative motor rotation speed is the predetermined cumulative motor rotation speed or greater, it is judged that the both-wheel lock is necessary.

The reason why the cumulative motor rotation speed is used is because when the wheel (the vehicle) moves slowly and continuously, there is a need to lock the both wheels, and also in a case where it is judged, due to a slight vehicle back-and-forth sway, that the both-wheel lock is necessary, this redundant judgment is avoided.

With respect to the judgment according to the motor rotation speed and the judgment according to the cumulative motor rotation speed, the both judgments could be made at the same time, or only one of the both judgments might be judged.

Here, if it is judged that the vehicle starts to move then the activation command is outputted to the unlocked side parking lock mechanism and the unlocked side parking lock mechanism is immediately activated, an abrupt change of the acceleration occurs upon the engagement of the parking pole and the parking gear, and consequently, the driver is subject to an odd or awkward feeling. Further, this might cause decrease in durability of the parking pole and the parking gear. Thus, the change of the rotation speed of the driving wheel is suppressed with torque, which acts on the driving wheel in a direction opposite to a moving direction, outputted by the unlocked side drive motor, then the parking lock mechanism is activated. The abrupt change of the acceleration can be therefore suppressed.

In the following description, a control process when activating the unlocked side parking lock mechanism will be explained.

FIG. 6 is a flow chart for operating the drive motor when outputting the activation command to the unlocked side parking lock mechanism on the basis of the motor rotation speed. This process starts when the motor rotation speed exceeds the predetermined rotation speed.

At step 11, the unlocked side drive motor is rotation-speed-feedback controlled so that a target motor rotation speed becomes 0 (zero) or a predetermined value that is less than the predetermined rotation speed. However, the unlocked side drive motor might be controlled so that a previously set certain torque is provided to the drive motor.

At step 12, a judgment is made as to whether or not an absolute value of the motor rotation speed of the unlocked side drive motor is less than the predetermined rotation speed. If the absolute value of the motor rotation speed of the unlocked side drive motor is less than the predetermined rotation speed, it is judged that the motor rotation speed converges and is less than the predetermined rotation speed, and the routine proceeds to step S14. If the absolute value of the motor rotation speed of the unlocked side drive motor is not less than the predetermined rotation speed, at is judged that the motor rotation speed is the predetermined rotation speed or more, and the routine proceeds to step S13, then a diagnosis timer for the judgment of the motor rotation speed convergence is reset. Also the routine returns to step S11, and the rotation speed feedback control continues.

At step 14, count-up of the diagnosis timer for the judgment of the motor rotation speed convergence is done.

Subsequently, at step S15, a judgment is made as to whether or not a count value of the diagnosis timer exceeds a diagnostic time by which it can be judged that the motor rotation speed converges. If it is judged that the count value of the diagnosis timer exceeds the diagnostic time, the routine proceeds to step S16, and the activation command is outputted to the unlocked side parking lock mechanism. On the other hand, if the diagnostic time does not elapse, the routine returns to step S11, and the motor rotation speed control continues, also a check of a convergence state of the motor rotation speed is continued.

FIG. 7 is time charts for operating the drive motor when outputting the activation command to the unlocked side parking lock mechanism. Here, an initial state of these time charts is a state in which the vehicle stops with only the right side parking lock mechanism PLR activated.

At time t1, a check is made as to whether or not an absolute value of the motor rotation speed of the left side drive motor is less than the predetermined rotation speed during a predetermined diagnostic time for which a predetermined vehicle stop state is diagnosed.

At time t2, when the absolute value of the motor rotation speed of the rear left wheel RL is the predetermined rotation speed or more, the torque is provided to the unlocked side left side drive motor ML, then the control is performed so that the rotation speed of the rear left wheel RL decreases.

At time t3, when the motor rotation speed of the left side drive motor ML is less than the predetermined rotation speed, a diagnostic time for the judgment of the motor rotation speed convergence is set. Then, a check is made as to whether or not the motor rotation speed absolute value of the left side drive motor ML is continuously less than the predetermined rotation speed for the diagnostic time.

At time t4, when the absolute value or the motor rotation speed of the drive motor ML is continuously less than the predetermined rotation speed for the diagnostic time for the judgment of the motor rotation speed convergence, the activation command is outputted to the left side parking lock mechanism PLL, and the rear left wheel RL is locked. At this time, since the rotation is almost in a stop state when the parking pole is engaged with the parking gear, the driver is not subject to the odd or awkward feeling.

Next, a process based on the cumulative motor rotation speed will be explained.

FIG. 8 is a flow chart for operating the drive motor when outputting the activation command to the unlocked side parking lock mechanism on the basis of the cumulative motor rotation speed. This process starts when the cumulative motor rotation speed exceeds the predetermined cumulative motor rotation speed.

At step S21, the unlocked side drive motor is rotation-speed-feedback controlled so that a target motor rotation speed becomes 0 (zero) or a predetermined value that is less than a predetermined rotation speed. However, the unlocked side drive motor might be controlled so that a previously set certain torque is provided to the drive motor.

At step S22, a judgment is made as to whether or not an absolute value of the cumulative motor rotation speed of the unlocked side drive motor is less than a value that is obtained by adding a cumulative differential motor rotation speed to the predetermined cumulative motor rotation speed. If the absolute value is less than this new threshold value obtained by the addition, it is judged that the movement of the vehicle is suppressed, and the routine proceeds to step S23. Here, the cumulative differential motor rotation speed is a value by which it can be judged that the movement of the vehicle converges or settles by the providing of the torque to the drive motor.

On the other hand, if the absolute value is not less than the new threshold value, which means that the cumulative motor rotation speed is the new threshold value or more, it is judged that a current state is a state in which the movement of the vehicle can not be suppressed even by the rotation speed feedback control, and the routine proceeds to step S25, then the activation command is immediately outputted to the unlocked side parking lock mechanism. With this process, the vehicle movement is forcibly suppressed.

At step S23, count-up of a diagnosis timer for the judgment of the cumulative motor rotation speed convergence is done.

At step S24, a judgment is made as to whether or not a count value of the diagnosis timer exceeds a diagnostic time by which it can be judged that the cumulative motor rotation speed converges. If it is judged that the count value of the diagnosis timer exceeds the diagnostic time, the routine proceeds to step S25, and the activation command is outputted to the unlocked side parking lock mechanism. On the other hand, if the diagnostic time does not elapse, the routine returns to step S21, and the motor rotation speed control continues, also a check of a convergence state of the cumulative motor rotation speed is continued.

FIG. 9 is time charts for operating the drive motor when outputting the activation command to the unlocked side parking lock mechanism on the basis of the cumulative motor rotation speed. Here, an initial state of these time charts is a state in which the vehicle stops with only the right side parking lock mechanism PLR activated.

At time t1, a check is made as to whether or not an absolute value of the cumulative motor rotation speed of the left side drive motor is less than the predetermined rotation speed during a predetermined diagnostic time.

At time t2, when the absolute value of the cumulative motor rotation speed of the rear left wheel RL is the predetermined rotation speed or more, the torque is provided to the unlocked side left side drive motor ML, then the control is performed so that the rotation speed of the rear left wheel RL decreases. At this time, a diagnostic time for the judgment of the cumulative motor rotation speed convergence is set, and also the cumulative differential motor rotation speed is added to the predetermined cumulative motor rotation speed, then this value is set as the new threshold value. Then, a check is made as to whether or not the cumulative motor rotation speed absolute value of the left side drive motor ML is continuously less than the new threshold value for the diagnostic time for the judgment of the cumulative motor rotation speed convergence.

Then, at time t3 at which the diagnostic time for the judgment of the cumulative motor rotation speed convergence elapses, when the cumulative motor rotation speed absolute value is less than the new threshold value, the activation command is outputted to the left side parking lock mechanism PLL, and the rear left wheel RL is locked. At this time, since the rotation is almost in a stop state when the parking pole is engaged with the parking gear, the driver is not subject to the odd or awkward feeling.

In view of the foregoing, the embodiment of the present invention includes the following configuration and effect.

(1) A parking lock control device of a vehicle has: a right side parking lock mechanism PLR that is provided at a right wheel RR that is driven by a drive motor MR (a right side motor); a left side parking lock mechanism PLL that is provided at a left wheel RL that is driven by a drive motor ML (a left side motor); a parking lock controller PLCU (a parking lock mechanism controller) that, when a parking lock activation command is outputted, activates either one of the parking lock mechanisms; and an inclination detecting unit 1, a present position detecting unit 2 and resolvers NR, NL (a vehicle behavior detecting unit) that estimate or detect a vehicle behavior in a case where only the one parking lock mechanism is activated. And the parking lock controller PLCU is configured to, when the vehicle movement is estimated or detected and the vehicle moves a predetermined amount or more, generate a torque that suppresses the vehicle movement by the drive motor connected to the other parking lock mechanism.

Accordingly, in a normal state, by activating only one parking lock mechanism, the power consumption can be suppressed, and the travel distance can be made longer. Further, even if the vehicle moves in the state in which only the one parking lock mechanism is activated, the vehicle movement can be suppressed by the operation of the drive motor. Thus, the odd or awkward feeling which the driver receives can be suppressed.

Here, a time when the one parking lock mechanism is activated could be a phase in which the activation command is outputted to the parking lock mechanism (i.e. before the one side is actually locked), or might be a phase after the parking pole is engaged with the parking gear by the fact that the parking lock mechanism is actually activated (i.e. after the one side is actually locked).

(2) The parking lock controller PLCU is configured to, when judged that the reticle movement is suppressed by the drive motor, activate the other parking lock mechanism.

Therefore, the other parking lock mechanism can be activated with the vehicle movement suppressed by the drive motor, thereby suppressing a shock that occurs upon the engagement of the parking pole and the parking gear. In addition, since the both parking lock mechanisms are activated, even in a case where a force continuously acts on the vehicle in the vehicle moving direction due to the slope or inclination, the power consumption by the motor drive can be suppressed.

Although the invention has been described above by reference to a certain embodiment of the invention, the invention is not limited to the embodiment described above. For instance, in the embodiment, as an example, the rear wheel drive type electric vehicle is explained. However, the vehicle is not limited to this vehicle as long as each wheel has the parking lock mechanism in a front wheel drive type electric vehicle or a four-wheel drive electric vehicle.

Further, in a casa where each of four wheels has the parking lock mechanism, configuration of the present invention is possible by combination or the parking lock mechanism on one side of right and left front wheels and the parking lock mechanism, on the other side of right and left rear wheels.

Furthermore, in the embodiment, when the driving wheel actually rotates, such torque as to suppress the rotation of the driving wheel is provided by the drive motor. However, the torque suppressing the rotation of the driving wheel could be provided when the rotation of the driving wheel has been predicted.

The invention claimed is:

1. A parking lock control device of a vehicle comprising: a right side parking lock mechanism that is provided at a right wheel that is driven by a right side motor; a left side parking lock mechanism that is provided at a left wheel that is driven by a left side motor; a parking lock controller that is configured to activate, when a parking lock activation command is outputted, either one of the parking lock mechanisms; and a vehicle behavior detecting unit configured to estimate or detect a movement of the vehicle in a case where only one parking lock mechanism is activated, wherein the parking lock controller being configured to, when the estimated or detected vehicle movement is a predetermined amount or more, generate a torque that suppresses the vehicle movement by the motor connected to the parking lock mechanism that was not previously activated.

2. The parking lock control device of the vehicle as claimed in claim 1, wherein:

the parking lock controller is configured to, when judged that the vehicle movement is suppressed by the motor, activate the parking lock mechanism that was not previously activated.

3. The parking lock control device of the vehicle as claimed in claim 1, wherein:
the vehicle behavior detecting unit is configured to detect the vehicle movement according to a rotation of the motor that corresponds to an unlocked side wheel.

4. The parking lock control device of the vehicle as claimed in claim 1, wherein:
the parking lock controller is configured to perform, to generate the torque, a rotation speed feedback control of the motor corresponding to the unlocked side wheel with a target motor rotation speed being 0 or a predetermined value that is less than a predetermined rotation speed.

5. A method for controlling parking lock of a vehicle, the vehicle having a right side parking lock mechanism that is provided at a right wheel that is driven by a right side motor and a left side parking lock mechanism that is provided at a left wheel that is driven by a left side motor, the method comprising:
when a parking lock activation command is outputted, activating either one of the parking lock mechanisms;
estimating or detecting a movement of the vehicle in a state in which the one parking lock mechanism is activated; and
when the estimated or detected vehicle movement is a predetermined amount or more, generating a torque that suppresses the vehicle movement at the motor connected to the parking lock mechanism that was not previously activated.

* * * * *